June 19, 1928.  1,673,875
H. A. KNOX
SUSPENSION FOR VEHICLES
Filed Oct. 28, 1925
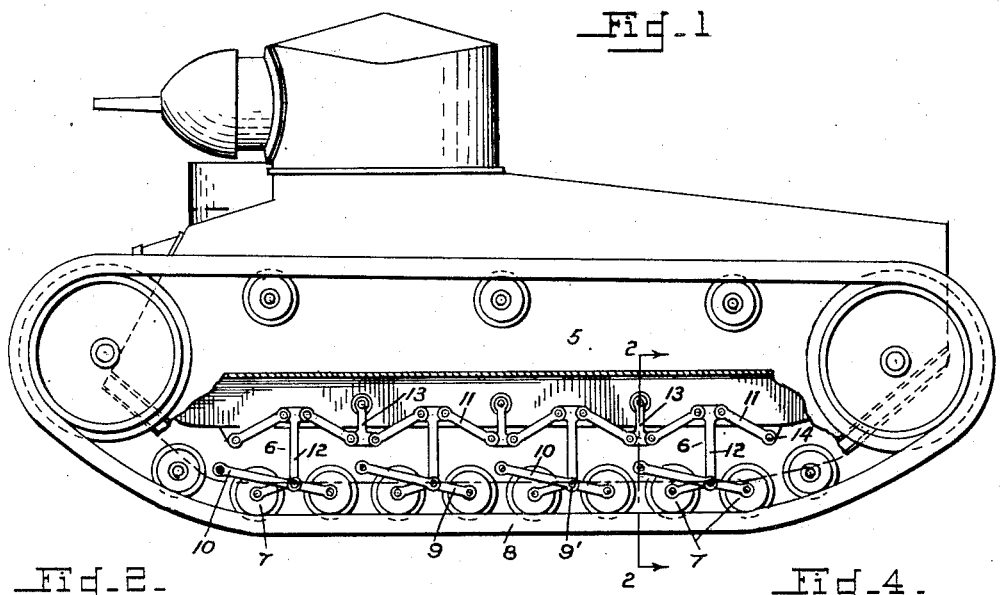
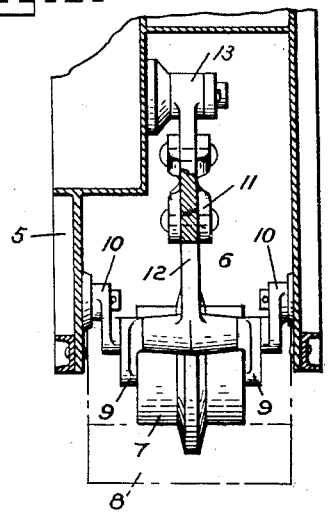
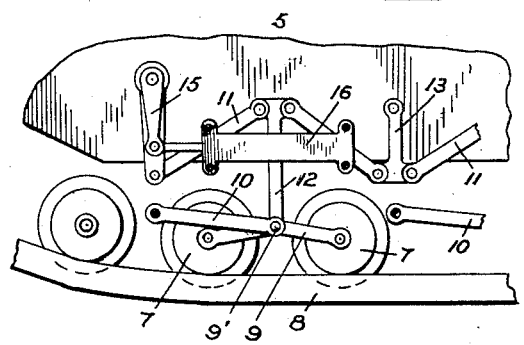
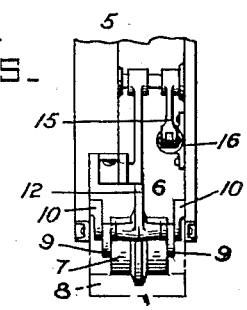
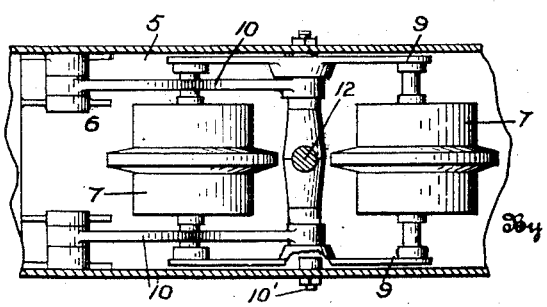
Inventor
Harry A. Knox
By W. N. Roach.
Attorney Patented June 19, 1928.

1,673,875

UNITED STATES PATENT OFFICE.

HARRY A. KNOX, OF DAVENPORT, IOWA.

SUSPENSION FOR VEHICLES.

Application filed October 28, 1925. Serial No. 65,467.

(GRANTED UNDER THE PROVISIONS OF THE ACT OF MARCH 3, 1883, 22 STAT. L., 625.)

The invention described herein may be manufactured and used by or for the Government for governmental purposes without the payment to me of any royalty thereon.

This invention relates to a suspension for vehicles and especially for roadless vehicles of the track laying type.

In roadless vehicles embodying a rope or cable suspension considerable difficulty has been encountered in that the cable frequently breaks after only slight use.

The principal object of this invention is to provide a strong and simple yielding suspension which comprises a system of swinging links by which the vehicle body is mounted on its supports and which will absorb shocks and automatically equalize the load when the individual supports pass over an obstruction or irregularity.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation of a vehicle constructed in accordance with the invention; the vehicle body partly broken away to show the suspension;

Fig. 2 is a transverse sectional view through one of the tracks taken on the line 2—2 of Fig. 1;

Fig. 3 is a fragmentary plan view of one of the supports, showing an alternate method of arranging the elements thereof;

Fig. 4 is a fragmentary view in side elevation showing an alternate method of securing the end links; and Fig. 5 is an end view thereof.

Referring to the drawings by numerals of reference:

In carrying out the invention a vehicle body 5 is designed to be yeildingly carried by supporting wheels without the employment of the usual spring devices. In a track laying vehicle to which this invention is especially applicable, the supporting means comprise independent bogie units 6 arranged in series on each side of the vehicle and consisting of a pair of wheels or rollers 7—7 in series, running on a rail formed by an endless track 8 and mounted on the ends of a rocker frame 9—9 which is held against lateral and longitudinal displacement by means of a pair of substantially horizontally disposed links 10—10 pivoted to the vehicle body and connected to the axle 9' of the frame. The links 10 may be on the outside of the frame member 9 as shown in Figure 2 or they may be on the inside thereof as shown in Figure 3, in which case the frame members 9—9 may act as rubbing plates against the vehicle body 5 which conveniently carries stop pins 10' for limiting the downward vertical movement of the unit.

The vehicle body is yieldingly mounted on the bogie units by means of a system of links consisting essentially of a link chain 11 whose joints are made with the free ends of alternate long and short arms respectively 12 and 13, the former pivoted to the bogie axles 9' and the latter to the vehicle body. The joints made with the long arms 12 of the bogies are normally in a plane slightly below the plane of the pivotal attachment of the body arms, which arms extend downwardly a sufficient distance to dispose the connecting links of the chain 11 at their most effective working angle.

As shown in Figure 1, the end links of the chain 11 may be pivotally secured to the body of the vehicle as at 14, but this arrangement may be altered as suggested in Figures 4 and 5 by connecting them to a crank 15 which is associated with a shock absorber 16.

When the vehicle is resting on level ground with its weight evenly distributed the bogie and body arms 12 and 13 will be in a vertical position. However, when encountering an obstruction or irregularity with a consequent raising or lowering movement of the particular supporting unit, a reverse movement is imparted to the adjoining elements of the link system, the bogie and body arms being free to shift from verticality. This change in the relation of the parts is transmitted to a greater or less extent throughout the series thereby equalizing the shock and distributing the load to all the supports.

The ability of the bogie and body arms 12 and 13 to shift from verticality eases the load on to the adjoining elements of the link suspension and reduces the abruptness of the shock.

The number of bogie units will obviously be governed by the length of the vehicle body. In a vehicle of normal length the linkage will cover the entire set of bogies as shown in the drawings, but when the number of bogies is so great that equalizing effect would not extend to the entire set, I may provide any number of link systems which will best fulfill the requirements of the situation.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A vehicle including a body, a plurality of independently movable supports each consisting of wheels mounted on a rocking frame, means for limiting lateral and vertical displacement of the supports, arms pivoted on the body between the supports, longer arms pivoted centrally on the supports, and links connecting the outer ends of the body and support arms.

2. A vehicle including a body, a plurality of independently movable supports, means for limiting lateral and longitudinal displacement of the supports, arms pivoted on the body between the supports, arms pivoted centrally on the supports, and links connecting the outer ends of the body and support arms.

3. A vehicle including a body, a plurality of supports, a link chain secured at each end of the body, swinging arms on the body and supports connecting with alternate joints of the chain, the connections of the support arms being approximately in the plane of the attachment of the body arms to the body and means for limiting movement of the supports.

4. A vehicle including a body, a plurality of supports, a link chain secured at each end of the body, non-extensible swinging arms on the body and supports connected to the chain and means for limiting movement of the supports.

5. A vehicle including a body, supports therefor, a link chain and swinging arm suspension connecting the body and supports and means for limiting movement of the supports.

HARRY A. KNOX.